Patented Apr. 5, 1949

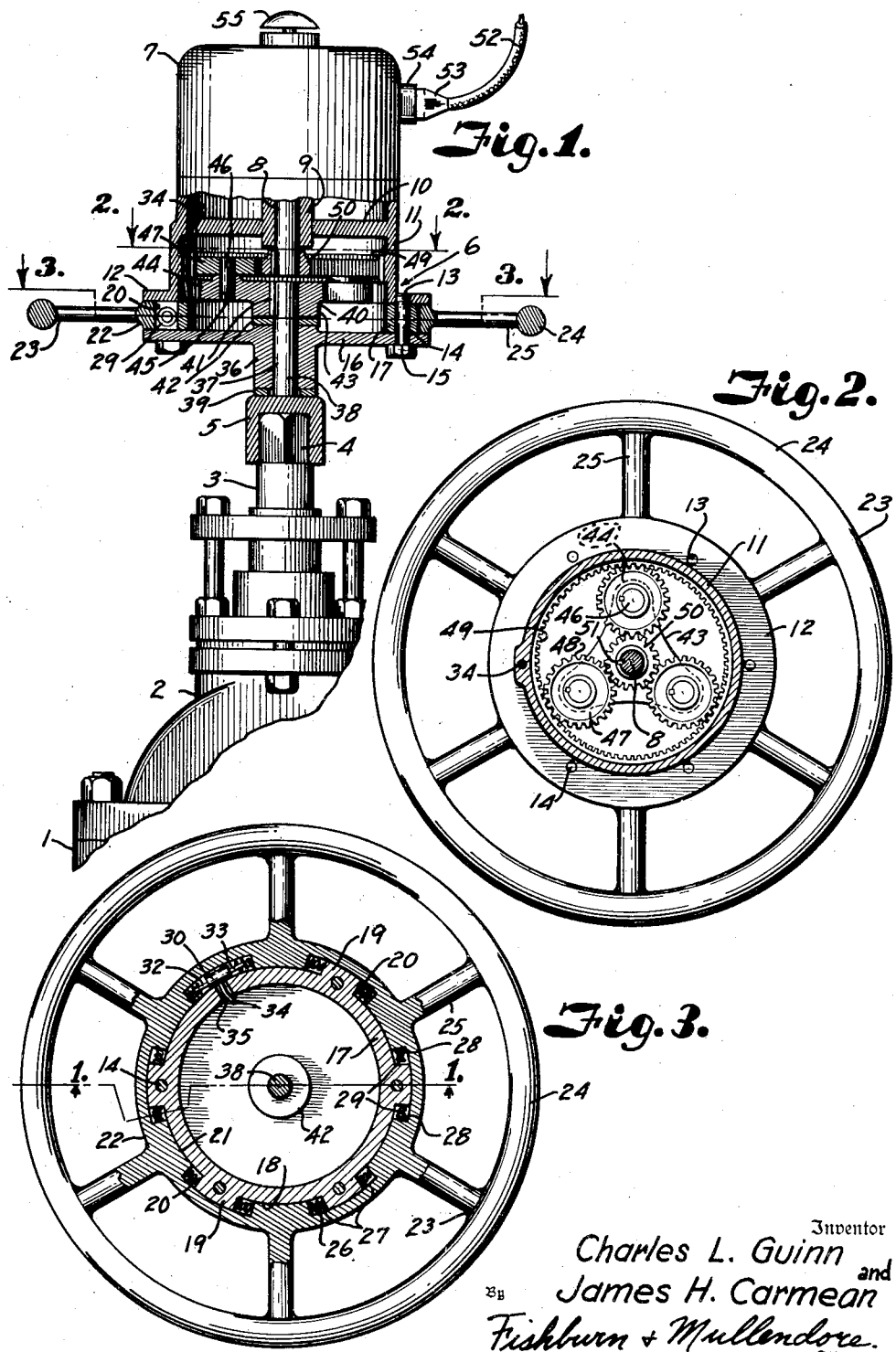

2,466,231

UNITED STATES PATENT OFFICE 2,466,231

DRIVING APPARATUS WITH MANUAL TORQUE CONTROL

Charles L. Guinn and James H. Carmean, Kansas City, Mo.

Application March 24, 1947, Serial No. 736,766

6 Claims. (Cl. 74—305)

This invention relates to driving apparatus with manual torque control and more particularly to a driving apparatus for supplying motive power in effecting the opening and closing of valves and the like. Although our invention is primarily designed for the actuation of large gate valves and the like, it will be understood that the invention is not restricted to a specific use of this character and may be adapted and used for the actuation of other rotatable members.

Valves of large size, such as gate valves and the like, are commonly operated by means of handwheels and their operation is slow and laborious. Mechanically operated valves are available but are complicated and expensive, each one requiring its own complete power and operating mechanism and in opening or closing the valve some means is usually necessary for stopping the operation of the power device whereby the final movement of the valve may be performed by hand.

The objects of the present invention are to provide a motive apparatus with manual torque control whereby both manual and power actuation are available for actuating a valve without requiring the employment of clutches or the like; to provide a motive apparatus and handwheel therefor for controlling the actuation of a rotatable member by pressure applied to said handwheel; to provide a motive apparatus with a handwheel flexibly connected thereto whereby the motor will not operate while the handwheel is free but will operate so as to turn the rotatable member connected to the motive apparatus in the direction in which the handwheel is turned; to provide a motor and suitable gearing with a flexibly connected handwheel for controlling the torque exerted by the motive apparatus; to provide a portable motive apparatus with a flexibly connected handwheel for control of the actuation of valves, the handwheel and housing for the motive apparatus being stationary during said actuation; to provide a relatively simple and inexpensive portable motive device for actuating a rotatable member which will be safe regarding personal injury to the operator or mechanical damage to the valve being operated; and to provide a handwheel torque control for manually controlling the torque applied by a motive apparatus to a rotatable member.

In accomplishing these and other objects of the present invention, we have provided improved details of structure and preferred forms of which are illustrated in the accompanying drawings, wherein:

Fig. 1 is an elevational view of a motive apparatus embodying the features of the invention applied to a conventional valve, portions being broken away to better illustrate the gear reduction and torque control.

Fig. 2 is a horizontal sectional view on the line 2—2, Fig. 1.

Fig. 3 is a horizontal sectional view through the apparatus on the line 3—3, Fig. 1.

Referring more in detail to the drawings:

1 designates a portion of a typical gate valve of the non-rising stem type having a bonnet 2 and a stem 3. The upper portion of the stem is provided with a splined, squared or other polygonal shaped end 4 adapted to receive a socket 5 of a motive apparatus 6 to provide a driving connection between said apparatus and the valve stem. The motive apparatus consists of a housing 7 enclosing a suitable reversible motor and suitable gear reduction (not shown) for rotating the shaft 8 carried by a bearing member 9 suitably supported in said housing and preferably concentric therewith by a head 10 which may be cast integral with the housing. The housing 7 has side walls 11 extending downwardly from the head 10 and terminates in an outwardly directed annular flange 12, said flange 12 having a plurality of threaded openings 13 therein for receiving the shanks 14 of screws 15 adapted to secure a cover plate 16 to the flange 12, said cover plate being drawn tightly against a spacing ring 17 located between the flange 12 and the plate 16 and cooperating therewith to enclose mechanism located in the housing as later described.

The outer diameter of the ring 17 is smaller than the outer diameter of the plate 16 and flange 12, said ring being provided with a plurality of recesses 18 spaced around the periphery thereof forming spaced lugs 19 adapted to be received in recesses 20 in the inner face 21 of a hub 22 of a handwheel 23, having a peripheral rim 24 connected to the hub 22 by means of a plurality of spaced spokes 25. The lugs 19 are substantially less in length than the recesses 20 to provide spaces 26 between the side faces 27 of said lugs and the side faces 28 of the recesses 20, compression springs 29 being located in each of the spaces 26 and having their ends in engagement with the respective faces 27 and 28 of the lugs and recesses whereby the springs exert pressure on the lugs 19, tending to maintain same centrally located relative to the recesses 20.

Located in one of the recesses 20 in place of the respective lug 19 is a housing 30 enclosing a double pole, double throw, center off, momentary contact switch, said switch housing having outwardly extending plungers 32 and 33 adapted to be selectively engaged by the faces 28 of the recess 20, said switch having a suitable conductor 34 extending through an aperture 35 in the ring 17 and upwardly in the housing 7 to the motor contained therein, whereby movement of the handwheel 23 in a clockwise direction, Fig. 3, will move the plunger 32 to close the circuit from a suitable source of electrical power to the reversible motor, energizing same to rotate the shaft 8 in a clockwise direction, or in the same direction as the movement of the handwheel, the circuit remaining closed only as long as turning pressure is applied to the handwheel in the desired direction of rotation. Movement of the handwheel in an anticlockwise direction will actuate the plunger 33 to effect operation of the motor to drive the shaft 8 in an anticlockwise direction.

The hub 18 of the handwheel preferably has an outside diameter substantialy the same as the outside diameter of the flange 12 and plate 16, whereby said hub is contained therebetween, said hub preferably being slightly less in width than the ring 17, permitting free movement of the handwheel.

Centrally located in the plate 16, and preferably coaxial with the shaft 8, is a depending bearing boss 36 having a bore 37 rotatably mounting a shaft 38 secured to the socket member 5, a washer 39 being interposed between the bearing boss and socket member. The shaft 38 extends from the socket member through the bore 37 into the housing 7, and mounted thereon is a spider 40 having driving relation with the shaft 38 as by a key 41, a washer 42 being interposed between the bearing boss and the spider whereby the washers 39 and 42 permit free rotation of the shaft and members relative to the bearing boss with substantially no end play therein. The spider 40 consists of a hub 43 having a plurality of outwardly directed arms 44, having bores 45 rotatably mounting shafts 46 of planet gears 47, whereby said gears are mounted on the spider and are of such size that the teeth 48 of the planet gears have meshing engagement with the teeth of an internal gear 49 on the inner wall of the housing 7, the teeth of the gears 47 also having meshing engagement with a gear 50, keyed as at 51, to the lower end of the shaft 8.

Current is provided the motor in the housing 7 by means of an electrical conduit 52 having connection with a suitable source of current, said conductor being provided with a plug 53 adapted to be received in a terminal connection 54 on the side of the housing 7 to supply current to the motor in such a manner that the operation of the motor is controlled by a safety switch 55, preferably mounted on the upper end of the motor housing 7 and of conventional structure whereby pressing on the switch button 55 will alternately make and break the circuit to the motor under control of the switch 30 operated by the handwheel 23.

In operating a device constructed as described, and assuming it is desirable to rotate a rotatable member, for example the stem 3 of a valve in a clockwise direction, the motive apparatus is moved adjacent said valve and a plug 53 of a conductor 52, having connection with a suitable source of electric power, is inserted in the electrical connection 54 to provide a source of current for the reversible motor in the housing 7. The apparatus is then lifted and placed on the valve stem whereby the squared portion 4 thereof is received in the socket 5. The switch button 54 is then pressed to provide current for the motor under control of the handwheel operated switch 30. The handwheel is then rotated in a clockwise direction, Fig. 3, whereby the face 28 of the recess 20 engages the plunger 32 to actuate a double pole, double throw, center off, momentary contact switch 30, making contact and closing the circuit therethrough as long as pressure is applied to the handwheel and the plunger 32. The motor is then energized to drive the shaft 8 in a clockwise direction, rotating the gear 50, which in turn rotates the gears 47 in an anticlockwise direction, Fig. 2. The gears 47 are rotatably carried by the shafts 46 on the arms 44 of the spider 40, and anticlockwise rotation of said gears 47 through their engagement with the internal gear will effect planetary movement of said gears 47 around the axis of the shaft 38, moving the spider in a clockwise direction. The spider is keyed to the shaft 38, thereby transmitting rotation to the socket 5 and stem 3 in a clockwise direction. Such rotation will continue so long as pressure is applied to the handwheel 23 to make contact through pressure on the plunger 32 of the switch 30.

Actuation of the motor and the valve stem may be stopped by release of the handwheel 23 permitting the springs 29 that are compressed through the original movement of the handwheel to effect counterclockwise directional movement of said handwheel to release pressure on the plunger 32 and open the circuit through the switch 30. The motor may also be stopped by pressing on the switch button 55 to open the circuit controlled thereby.

If continued operation of the motor is desired, pressure may be maintained on the handwheel until the valve reaches the final of its movement, for example seating on the valve seat. As the valve member moves into seating engagement with the seat there is increased resistance to rotation of the stem and the spider 40 and increased tendency for the gears 47 to effect counterclockwise rotation of the housing 7 and the handwheel 23. Therefore the torque exerted on the stem 3 by the power apparatus is controlled directly by the pressure applied through the handwheel 23 and in the same direction as the direction of the application of pressure thereon and the power apparatus may be used to move the valve member throughout its entire movement to completely closed and seated position without danger of damage to the valve parts and when said valve is seated to the full pressure desired by the operator, the handwheel may be released to stop the motive apparatus and movement of the stem 3. If continued pressure is applied to the handwheel 23, torque will be applied to the valve until the power of the apparatus and the resistance of movement of the valve member overcomes the pressure applied on the wheel whereby said wheel will tend to be moved by the power apparatus in an anticlockwise direction, and if the housing and handwheel are rotated there will be a tendency to wrap the cord 52 around the housing 7, drawing the plug 53 from the socket connection 54. Movement of the handwheel in a counterclockwise direction actuates the plunger 33 of the switch 30 to close the circuit energizing the motor in the housing 7 and effecting reverse or counterclockwise directional movement of the shaft 8. The gear 49 is held by the handwheel thereby effecting clockwise movement of the gears 47, Fig. 2, and as long as the handwheel 23 is held to resist rotational forces with pressure applied in counterclockwise direction, rotation of the gears 47 will effect planetation thereof and counterclockwise rotation of the spider 40, shaft 38 and socket 5 to rotate the rotatable member in a counterclockwise direction, the motor and apparatus being controlled and stopped in the same manner as described for the clockwise direction.

While the apparatus has been described and illustrated as applied directly to the stem of a valve, it is believed obvious that the motive apparatus could be used for remote control of a valve by merely providing some driving connection between the sockets 5 and the stem 3, and also that the motive apparatus may be used for actuating any rotatable member and providing manual torque control thereof, the apparatus being portable and having no exposed moving parts except the socket 5, therefore having the maximum of safety for the operator, the operator at all times having complete control and knowledge of the torque being exerted on the rotatable member thereby avoiding excessive torque and permitting the final opening or closing of a valve or other structure without damage to the parts thereof.

It is believed obvious that we have provided a simple, inexpensive and safe portable apparatus with a manual torque control for efficiently operating rotating members.

What we claim and desire to secure by Letters Patent is:

1. In a device for driving a rotatable member, a motor, a housing for the motor, means operatively connecting the motor with the rotatable member, a handwheel on the housing and having limited relative rotational movement therewith, and means responsive to relative rotation of the housing and handwheel for effecting operation of the motor, the operation of said motor effecting relative rotation of the rotatable member and housing, whereby rotative pressure on the handwheel resisting rotation of the housing effects rotation of the rotatable member in the same direction as the pressure on the handwheel.

2. In a device for driving a rotatable member, a shaft, a motor having driving connection with the shaft, means including gears operatively connecting the shaft with the rotatable member, a handwheel engageable with said motor and having limited relative rotational movement therewith for applying rotative pressure to the motor for resisting the torque reaction of said motor whereby rotative pressure exerted on said handwheel controls the torque applied to the rotatable member by operation of said motor, and means responsive to relative rotation of the motor and handwheel for controlling operation of said motor.

3. In a device for driving a rotatable member, a housing, a shaft rotatable in said housing, a driving member on said shaft, a spider rotatably mounted in said housing, driving means rotatably mounted on the spider, said driving means having driving engagement with the driving member on the shaft and the housing, control means on the housing and having limited relative rotational movement therewith for holding the housing stationary, a motor for rotating the shaft whereby the spider is rotated, a switch on the housing and operable responsive to relative rotation of the housing and control means for controlling operation of the motor, and means drivingly connecting the spider with the rotatable member.

4. In a device for driving a rotatable member, a housing, a shaft rotatable in said housing, a gear on said shaft, an internal gear fixed in the housing, a spider rotatably mounted in said housing, a plurality of gears rotatably mounted on the spider, each of said gears meshing with the gear on the shaft and the internal gear for rotating the spider in response to relative rotation of the shaft and housing, a handwheel on the housing and having limited relative rotational movement therewith for exerting pressure on the housing tending to rotate same in one direction, a motor for rotating the shaft in the same direction as the pressure applied to the handwheel to drive the gears on the spider whereby the torque reaction of the housing effects planetation of said gears on the spider and rotation of said spider in the same direction as the pressure applied by the handwheel, means responsive to relative rotation of the handwheel and housing for controlling operation of the motor, and means drivingly connecting the spider with the rotatable member.

5. In a device for driving a rotatable member, a housing, a shaft rotatable in said housing, an electric motor for driving said shaft, a gear on said shaft, an internal gear fixed in the housing, a spider rotatably mounted in said housing, a plurality of gears rotatably mounted on the spider and meshing with the gear on the shaft and the internal gear, a handwheel flexibly mounted on the housing for limited rotational movement thereon for resisting torque reaction tending to rotate the housing, a switch on the housing operable in response to movement of the handwheel for closing an electrical circuit to the motor to energize same and effect rotation of the shaft whereby the spider is rotated in the same direction, and means drivingly connecting the spider with the rotatable member.

6. In a device for driving a rotatable member, a housing, a shaft rotatable in said housing, a gear on said shaft, an internal gear in the housing, a spider rotatably mounted in said housing and coaxial with the shaft, a plurality of gears rotatably mounted on the spider, each of said gears meshing with the gear on the shaft and the internal gear, a handwheel mounted on the housing, lugs on the handwheel engageable with the housing to limit relative rotation of said handwheel and housing, springs between the lugs and housing resisting movement of said handwheel, a switch on the housing operable in response to movement of the handwheel for closing an electrical circuit to the motor to energize same and effect rotation of the shaft whereby the spider is rotated in the same direction, and means drivingly connecting the spider with the rotatable member.

CHARLES L. GUINN.
JAMES H. CARMEAN.

REFERENCES CITED

The following references are of record in the file of this patent:

UNITED STATES PATENTS

| Number | Name | Date |
| --- | --- | --- |
| 936,870 | Duntley et al. | Oct. 12, 1909 |
| 1,784,094 | Fletcher | Dec. 9, 1930 |
| 2,132,023 | Fuller | Oct. 4, 1938 |
| 2,232,165 | Cochran | Feb. 18, 1941 |